June 19, 1951     W. WILLIAMS ET AL     2,557,490
CLEARANCE SWITCH FOR AUTOMOBILES
Filed Feb. 14, 1950     2 Sheets-Sheet 1
FIG. 1
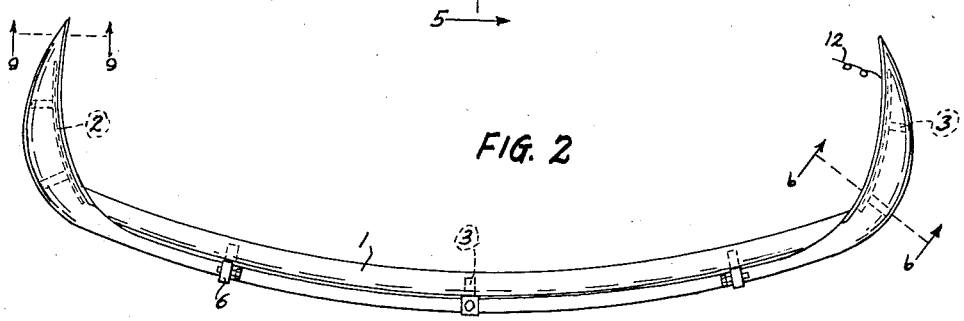
FIG. 2
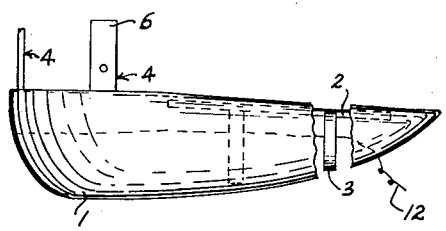
FIG. 3
FIG. 9
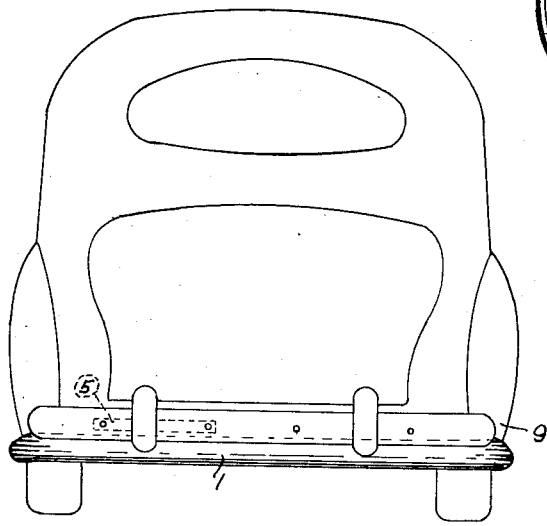
FIG. 4
William Williams
Fred F. Brown
INVENTORS
BY
Lannas S. Henderson Jr.
AGENT

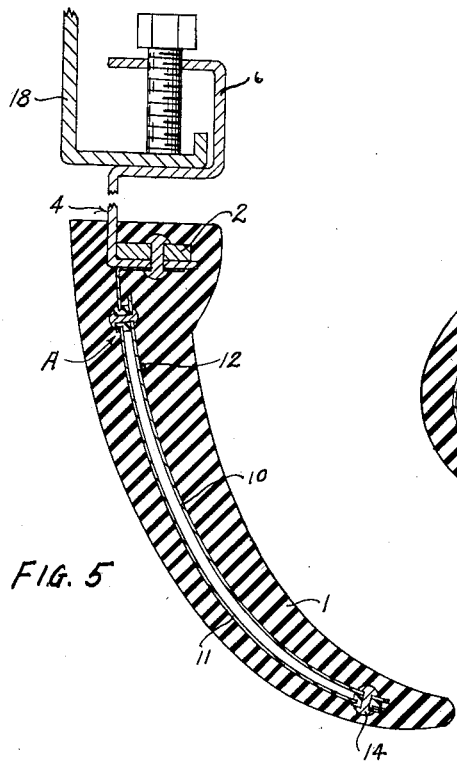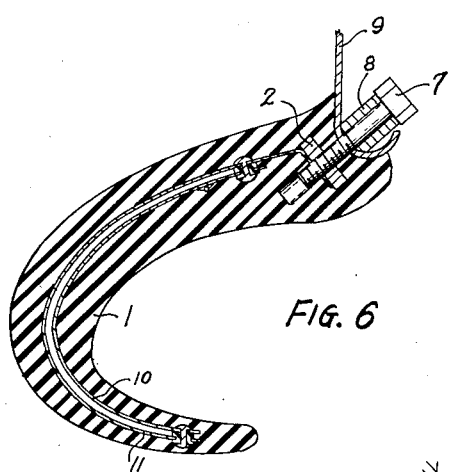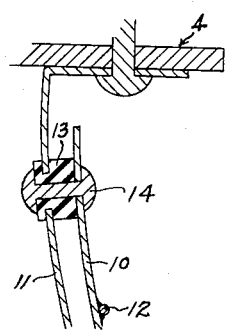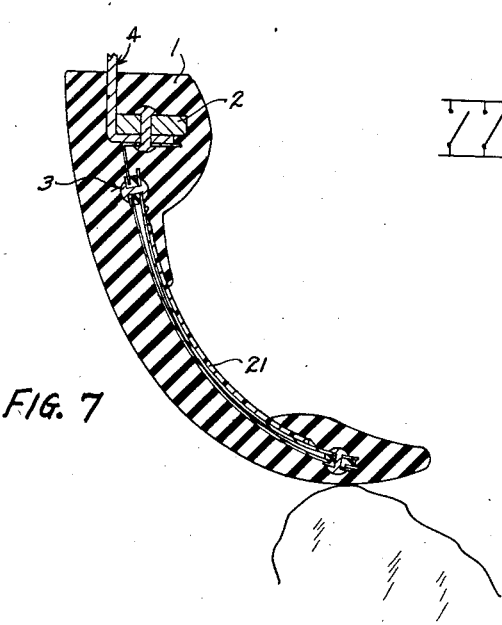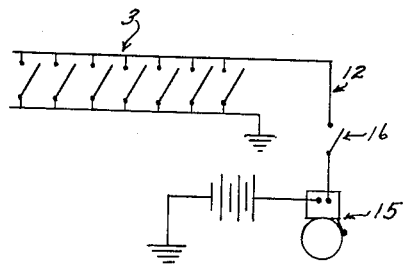

Patented June 19, 1951

2,557,490

UNITED STATES PATENT OFFICE 2,557,490

CLEARANCE SWITCH FOR AUTOMOBILES

William Williams, Emery Park, and Fred F. Brown, Tucson, Ariz.

Application February 14, 1950, Serial No. 144,089

5 Claims. (Cl. 200—52)

This invention relates to a resilient warning device in the form of an elongated rubber muff designed to follow lengthwise the inside bumper contour of present day automobiles, and to extend a few inches below the bumper, in such manner as to warn the driver when an obstacle, either seen or unseen, would be encountered by the undercarriage of the automobile. On either side, the device curves laterally beyond the lateral bumper extremities and attaches to the lower part of the adjacent fenders, forming a curb warning device for parking. The wide U-shaped muff so formed is designed primarily for attachment to the rear bumper and fenders, since it is primarily in backing a car that unseen obstacles, such as a child playing in a driveway, might be encountered. However a similar device for the front bumper may be provided if desired.

The device consists broadly of a rubber molding, shaped as shown and described, having a plurality of internal contact switches connected in parallel, so that when any part of the rubber molding is distorted, a switch will be closed, thereby energizing a warning signal in the driver's compartment, such as a buzzer, bell, or light.

It will be appreciated that many modern cars are so constructed that parts of the undercarriage extend below the lower level of the bumpers. Such parts include spring hangers, differential gear housings, mufflers, gasoline tanks, and sometimes the oil pan. In passing over obstacles in the path of the vehicle it is not always possible to tell whether they will clear these parts of the undercarriage, and thus damage may result, either to the automobile, or the object passed over. Moreover these underhanging parts detract from the appearance of the car.

It is therefore an object of our invention to provide, in a single unit, a warning system which will warn the driver of any obstacles in his path which will not clear the undercarriage of the car, and will indicate when a curb is contacted in parking, both before damage is done to the undercarriage or finish of the car.

A specific object of the invention is to provide a safety device which would minimize the annual toll of lives caused by accidentally backing automobiles over children playing in driveways and such.

A further object of the invention is to provide a bumper muff which would obstruct and minimize the backward throwing of mud and gravel by the rear wheels under wet weather conditions, detrimental to following motorists.

A still further object of our invention is to improve the appearance of the lower contours of present day automobiles by covering from view such irregular parts of the undercarriage as spring hangers, differential housings, rough fender edges, gasoline tanks, and any part which may be visible from front or rear.

Other objects of the invention will appear from the description which follows:

In the drawings,

Figure 1 is a front elevation of the device.

Figure 2 is a top plan view of the device;

Figure 3 is a side elevation of the device;

Figure 4 is an elevation showing the device mounted to the rear of an automobile.

Figure 5 is a cross section taken along line 5—5 of Figure 1, showing the switch detail.

Figure 6 is a similar cross section taken along line 6—6 of Figure 2.

Figure 7 is like Figure 5, but shows an alternative form in which the rubber molding may be cast, and shows the molding deflected by an obstacle, thus closing the switch.

Figure 8 is a diagrammatic view showing the connections of the electrical elements involved.

Figure 9 is a cross section taken along line 9—9 of Figure 2, showing an alternative fender attachment.

Figure 10 is an enlarged view of the portion shown at A in Figure 5.

Referring to the drawings, the numeral 1 indicates the resilient molding or muff, which may consist of rubber or other flexible, non-conducting plastic material. This muff is cast in a single molding, and has a wide, U-shaped plan, as shown in Figure 2. The vertical cross sectional contour of the muff varies along its length. Along the length of the bumper it is curved slightly inwardly, forming a half-crescent shape, as shown in Figure 5; along the two fender lengths, it projects more sharply outwardly from the top and curves inwardly more sharply from its outer extremity forming a flattened C-shape, as shown in Figure 6. The transition between these 2 curves may be made gradually at the elbows of the U. Along the fenders, the muff should project outwardly beyond the farthest lateral reach of the bumper or fender; along the bumper, it should hang about 4 inches below the lower edge of the bumper, and is preferably spaced about 2 inches behind the bumper.

The top edge of the muff, which attaches to the automobile, is preferably thicker than the lower part in order to minimize twisting of the muff on support bars 2 when a stress is encountered.

If necessary, an indentation 17 may be provided in the lower part of the muff to accommodate outwardly projecting exhaust tail-pipes. If such an opening is necessary, suitable heat insulation should be provided around the tail-pipe.

The core of the rubber molding comprises a supporting bar, or bars 2, and a plurality of depending flexible strip contact switches 3. The supporting bars 2 are imbedded near the top of the muff and may consist of rectangular metal strips or bars. The metal may be iron or aluminum, or any other adequate electrical conductor.

The support bar may be unitary and extend the entire length of the muff, or three separate segments may be used; one along the major length of the bumper, and one adjacent each fender, as illustrated.

Extending upwardly from the central support bar 2, we provide a plurality of hangers 4 adapted to be attached rigidly to suitable frame structures on the vehicle. Along the bumper length, the attachment may preferably be made to the bumper supports 5 by means of clamps 6. In the center of the bumper, an attachment may be made to the lower body extremity 18.

The hangers 4 are attached to support bars 2 by any suitable means, as by welds or rivets.

Along the fenders, the attaching mechanism may consist merely of elongated bolts 7 which extend through holes in the bottom of the fender 9, and are threaded into side bars 2. The head of bolt 7 bears downwardly against a sleeve 8.

As shown in Figure 9, an alternative type of support may be provided along the fenders, consisting of a metal strip 19, bent as shown, and a tightening bolt 20. This alternative form is contemplated as more convenient for owner-installation. The inner end of strip 19 may be either attached to a support bar 2 or simply embedded in the rubber. Obviously any desired number and type of hangers, or other supporting devices, may be provided along the lengths of support bars 2.

The contact switches 3 consist of a positive pole strip 10, and a negative pole strip 11 which is connected by weld, rivet or other suitable means to support bar 2. It will thus be seen that negative strip 11 is grounded, since contact is made through hangers 4 or bolts 7 with the automobile frame. The positive strips 10 are connected by a positive wire 12 running lengthwise through the length of the muff.

Strips 10 and 11 are insulated from each other by means of insulation 13 at their extremities where they are secured together by means of rivets 14.

Any flexible resilient conductor may be used for strips 10 and 11, preferably thin strips of spring steel. They should be formed to approximate the curvature of the muff at the point they are to occupy.

Figure 7 shows how contact is made in a switch when its curvature is increased. Since the rivet bindings 14 hold strips 10 and 11 rigidly together, bending displaces the axes of rivets 14, causing inner strip 10 to bend more sharply than outer strip 11, until a contact is eventually made, closing the switch. The strips should be separated by a space of about $\frac{1}{16}$ to $\frac{1}{8}$ inch so that contact will be made when the bottom of the muff is displaced about an inch. Any desired number of switches may be used, but we have found that about 2 for each fender and 3 or 4 distributed evenly along the bumper length, are sufficient in most cases.

The positive wire 12 is connected as shown in Figure 8 to a buzzer or bell 15 located in the drivers' compartment. An auxiliary manual switch 16 may be provided in case one of the switches 3 should become bent or otherwise permanently closed.

Those skilled in the art will readily understand how the device we have described may be manufactured. The core, consisting of bars 2, switches 3 and hangers 4 is first assembled, wire 12 is connected, by soldering for example, to pole strips 10, and the switches 3 are encased in a flexible sheath to keep the molten rubber out of the spaces between strips 10 and 11. The whole core is then supported accurately in the mold and the molten rubber is injected. After cooling and finishing the article is ready for installation as previously explained.

In the modification shown in Figure 7, the rear face of the rubber muff is left partially open so that access may be had to the various switches for repair or replacement. A flexible plastic shield 21 may be provided to keep water and debris out of the switches.

Having explained our invention fully, and its manner of manufacture and use, we do not wish to be limited to the precise details set forth, but only broadly as set forth in the following claims.

We claim:

1. An alarm device comprising an elongated resilient molding having a C-shaped vertical cross-section and adapted to be attached to the bumper carriage of an automobile, and to extend below the bumper thereof, said molding having lateral arms at each end adapted to be attached to and project substantially outwardly from the lower part of the adjacent fenders, said molding enclosing a plurality of regularly spaced, resilient C-shaped electrical contact switches connected in parallel to external terminals, each of said switches being closable by an increase in its curvature, whereby an increase in the vertical curvature of any part of said molding will effect a closing of at least one of said contact switches.

2. A rubber muff having a wide U-shaped plan, and a C-shaped vertical cross section tapered downwardly in thickness, said muff being adapted to follow the inside plan of an automobile bumper and to depend below said bumper, the arms of said muff being adapted to curve around the lower parts of the adjacent fenders and to project substantially outwardly therefrom, conducting means for supporting said muff from said bumper and said fenders, a plurality of resilient, C-shaped electrical contact switches embedded in said muff and the arms thereof, one terminal of each of said switches being electrically connected to said supporting means, the other terminal of each switch being connected to a transverse conductor, said switches being closable by an increase in their curvature, whereby an increase in the vertical curvature of said muff will effect a closing of at least one of said contact switches.

3. The device set forth in claim 2 wherein said contact switches comprise 2 C-shaped resilient metal strips concentrically spaced about $\frac{1}{16}$ to $\frac{1}{8}$ inch apart, and secured together at each extremity by non-conducting bindings.

4. A combined curb-indicator and road-obstacle alarm for automobiles, comprising a plurality of resiliently operable contact switches connected in parallel and spaced and adapted to depend a few inches below the entire length of an automobile bumper, and to protrude outwardly from the lower adjacent fender areas, a solid, resilient body having a wide U-shaped plan conforming approximately to the bumper and adjacent fender plan of an automobile enveloping said switches and adapted to close one of said switches when any part of said body is vertically distorted, and operative means for securing said body to an automobile chassis.

5. A road obstacle alarm device comprising an elongated resilient molding having a C-shaped vertical cross section and adapted to be attached to the bumper carriage of an automobile, and to depend a few inches below a substantially major length of the bumper thereof, electrically conducting means for supporting said molding from said bumper carriage, a plurality of resiliently operable, C-shaped electrical contact switches enclosed at spaced intervals within said molding, one terminal of each of said switches being electrically connected to said supporting means, the other terminal of each switch being connected to a transverse conductor, said switches being closable by an increase in their curvature, whereby an increase in the vertical curvature of said molding will effect a closing of at least one of said switches.

WILLIAM WILLIAMS.
FRED F. BROWN.

REFERENCES CITED

The following references are of record in the file of this patent:

UNITED STATES PATENTS

| Number | Name | Date |
| --- | --- | --- |
| 1,915,292 | Conklin | June 27, 1933 |